(12) United States Patent
Lee et al.

(10) Patent No.: US 7,755,353 B2
(45) Date of Patent: Jul. 13, 2010

(54) THREE-AXIS FLUXGATE-TYPE MAGNETISM DETECTING DEVICE

(75) Inventors: Woo-jong Lee, Suwon (KR); Sang-on Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 12/013,727

(22) Filed: Jan. 14, 2008

(65) Prior Publication Data

US 2008/0116888 A1     May 22, 2008

Related U.S. Application Data

(63) Continuation-in-part of application No. 10/984,754, filed on Nov. 10, 2004, now Pat. No. 7,352,177.

(30) Foreign Application Priority Data

Nov. 26, 2003    (KR)  ................. 2003-84631

(51) Int. Cl.
    *G01R 33/02*     (2006.01)
    *G01R 33/04*     (2006.01)
(52) U.S. Cl. ...................... 324/247; 324/253
(58) Field of Classification Search ............. 324/202, 324/244, 247, 249, 253, 254, 255; 33/355 R
See application file for complete search history.

(56) References Cited

U.S. PATENT DOCUMENTS

| | | | |
|---|---|---|---|
| 2,852,859 A | 9/1958 | Depp | |
| 3,573,610 A | 4/1971 | Kesselring | |
| 3,862,499 A | 1/1975 | Isham et al. | |
| 4,179,741 A | 12/1979 | Rossani | |
| 5,046,260 A | 9/1991 | Wellhausen | |
| 5,287,295 A | 2/1994 | Ives et al. | |
| 5,537,038 A | 7/1996 | Ando | |
| 5,953,683 A | 9/1999 | Hansen et al. | |
| 6,130,534 A | 10/2000 | Huang et al. | |
| 7,352,177 B2 * | 4/2008 | Lee et al. .................. | 324/247 |
| 2002/0083605 A1 | 7/2002 | Blank et al. | |
| 2004/0169505 A1 | 9/2004 | Alun et al. | |

FOREIGN PATENT DOCUMENTS

| | | |
|---|---|---|
| EP | 0 330 045 A | 8/1989 |
| JP | 63-19515 A | 1/1988 |
| JP | 1-500618 A | 3/1989 |
| JP | 2-502400 A | 8/1990 |
| JP | 4-250379 A | 9/1992 |
| JP | 4-259872 A | 9/1992 |
| JP | 6-288770 A | 10/1994 |
| JP | 7-110367 A | 4/1995 |
| JP | 2000-321067 A | 11/2000 |
| WO | WO 88/06274 | 8/1988 |

* cited by examiner

*Primary Examiner*—Kenneth J Whittington
(74) *Attorney, Agent, or Firm*—Sughrue Mion, PLLC

(57) ABSTRACT

A three-axis fluxgate-type circuit having three fluxgate sensors for outputting three analog voltage values respectively. A controller normalizes three digital voltage values corresponding to said three analog voltage values, select a set of linear voltage values from the three normalized digital voltage values and calculate an azimuth based on the set of linear voltage values.

10 Claims, 7 Drawing Sheets

THREE-AXIS FLUXGATE-TYPE MAGNETISM DETECTING DEVICE

This application is a Continuation-in-Part of co-pending U.S. application Ser. No. 10/984,754, filed on Nov. 10, 2004, which claims benefit under 35 U.S.C. §119 from Korean Patent Application No. 2003-84631, filed on Nov. 26, 2003, the entire contents of which applications are incorporated herein by reference.

BACKGROUND

1. Field of the Disclosure

This disclosure teaches techniques related to a magnetism detection device and method using a fluxgate circuit, and more particular to a magnetism detection device and method using a three-axis fluxgate circuit.

2. Description of the Related Art

Geomagnetic sensors are devices used for measuring the geomagnetic intensity and orientation that human beings cannot feel. In particular, geomagnetic sensors using a fluxgate circuit are referred to as fluxgate sensors. Such geomagnetic sensors measure the geomagnetic field of an observation point and indicate the orientation of the geomagnetic field, so that they can be used for diverse purposes such as providing map information displayed on vehicle navigation devices, hand-held phones, portable terminals, and so on.

On the other hand, the fluxgate-type magnetism detection devices such as the fluxgate sensors use a high-magnetic permeability substance such as permalloy as a magnetic core. An excited magnetic field is applied from a drive coil to the magnetic core. Secondary harmonic components in proportion to an external magnetic field are measured by use of non-linear magnetic characteristics. Thus the intensity and orientation of the external magnetic field is measured.

Such fluxgate-type magnetism detection device was developed in the late 1930's. These devices have good sensitivity, low cost, and are relatively small size when compared to the other magnetism detection devices. Further, such fluxgate-type magnetism detection devices consume less power and have excellent long-term stability. Such devices are widely used for civilian and military purposes including ore vein prospecting, target detections, artificial satellite posture controls, and space probes. In addition, they are used for the detection of weak magnetic fields and measurements of the absolute orientation of the Earth. Significant research is ongoing to improve the performance.

FIG. 1 is a block diagram for showing a structure of a conventional fluxgate-type magnetism detection device. In FIG. 1, the conventional fluxgate-type magnetism detection device 100 comprises a drive pulse generation circuit 110, a coil-driving current amplification circuit 120, a two-axis fluxgate circuit 130, a chopping circuit 140, a primary amplification circuit 150, a low-pass filter 160, a secondary amplification circuit 170, an analog/digital converter 180, a controller 191, and a memory 193.

The drive pulse generation circuit 110 generates drive pulses for driving the two-axis fluxgate circuit 130, selectively outputs and applies the drive pulses to the coil-driving current amplification circuit 120. The coil-driving current amplification circuit 120 uses plural amplifiers and inverters to output pulse signals and inverted pulse signals whose phases are opposite to the pulse signals output from the drive pulse generation circuit 110.

The two-axis fluxgate circuit 130 is provided with X-axis and Y-axis fluxgate sensors that are perpendicular to each other, driven by the pulse signals and inverted pulse signals that are respectively sent to the X-axis and Y-axis fluxgate sensors, and outputs a detection signal corresponding to an electromotive force induced due to the drive signals. The X-axis and Y-axis fluxgate sensors have two rectangle-shaped magnetic cores respectively installed in length directions of the X and Y axes, and each of the magnetic cores has a drive coil and a detection coil wound thereon. If the drive pulses are applied to the drive coil, a magnetic field is generated around the X-axis and Y-axis fluxgate sensors, so that the fluxgate sensors can detect an induced electromotive force through the detection coil.

The electric signal detected by the two-axis fluxgate circuit 130 controls plural switches built in the chopping circuit 140 for chopping. The chopped electric signal is differential-amplified in the primary amplification circuit 150, filtered to include only the signal of a certain range using the low-pass filter 160, and finally amplified in the secondary amplification circuit 170. The amplified signal is converted to a digital voltage value in the A/D converter for an output.

The controller 191 uses the maximum and minimum values of the X and Y axes that are stored in the memory 193 such that a bias value of the X axis is an average value of the maximum and minimum values of the X axis and a scale value of the X axis is a value obtained from dividing a difference of the maximum and minimum values of the X axis by two.

A normalized value is obtained by subtracting the bias value of the X axis from a digital voltage value output from the X-axis fluxgate sensor and dividing a subtraction result by the scale value. A normalized value of the Y axis is obtained by repeating the same process for the X axis as above. On the other hand, FIG. 2 is a graph for showing normalized digital voltage values output from the X-axis and Y-axis fluxgate sensors. The normalized output values of the X-axis fluxgate sensor and the normalized output values of the Y-axis fluxgate sensor are expressed as functions of cos( ) and sin( ), respectively. That is, a reference number 201 denotes normalized output values of the X-axis fluxgate sensor, and a reference number 202 denotes normalized output values of the Y-axis fluxgate sensor.

Further, the controller 191 calculates an azimuth at a current state by use of the corrected digital voltage values so that a current azimuth can be generated.

The function of $\tan^{-1}( )$ is mainly used for a process for calculating azimuths by use of the corrected digital voltage values. That is, the controller 191 normalizes the measured fluxgate voltage values of the X and Y axes, and uses an ideal value cos ψ of the function of cos( ) and an ideal value sin ψ of the function of sin( ) in Equation 1 as below for the calculation of an azimuth.

$$\psi = \tan^{-1}\left(\frac{\sin\psi}{\cos\psi}\right), \quad \text{[Equation 1]}$$

wherein ψ denotes an azimuth, and cos ψ and sin ψ denote corrected digital output values from the X-axis and Y-axis fluxgate sensors.

When the above process is used, an azimuth is obtained by taking a value of $\tan^{-1}( )$ in the first quadrant in which output values are all positive. 180° is added to an angle obtained from a value of $\tan^{-1}( )$ not only in the second quadrant in which the values of the X axis are negative and the values of the Y axis are positive but also in the third quadrant in which the values of the X and Y axes are all negative. 360° is added to an angle obtained from a value of $\tan^{-1}( )$ in the fourth quadrant in which the values of the X axis are positive and the values of the Y axis are negative.

However, if azimuth calculation is performed as above, the controller can be overloaded due to the complicated calculation procedures. The maximum and minimum values of the digital voltage values have to be stored in advance for calculations of amplitudes and the offset values necessary for the calibration procedures. This causes wastage of memory resources. Further, in case that the azimuth calculation process as above is employed, the linear and non-linear portions of the digital voltage values are all used, which brings about a drawback of generating errors at 0°, 90°, 180°, and 270°.

SUMMARY

The disclosed teachings are aimed at overcoming some of the above problems associated with related art. An aspect of the present invention is to provide three-axis fluxgate-type magnetism detection device and method capable of easily calculating azimuths by using only linear portions of digital values calculated by use of a three-axis fluxgate-type circuit.

The foregoing and other objects and advantages are substantially realized by providing a three-axis fluxgate-type magnetism detection device, comprising a three-axis fluxgate-type circuit having three fluxgate sensors for outputting three analog voltage values respectively. A controller normalizes three digital voltage values corresponding to said three analog voltage values, selects a set of linear voltage values from the three normalized digital voltage values and calculates an azimuth based on the set of linear voltage values.

In another specific enhancement, the set of linear voltage values have a medium magnitude from among the three normalized digital voltage values.

In another specific enhancement, a memory operable to store a normalized reference magnitude value is provided, wherein the controller calculates the azimuth based on a ratio of the reference magnitude value to the set of linear voltage values, and wherein the reference magnitude value is set at an initial stage through rotations of the three-axis fluxgate-type magnetism detection device when a geomagnetic field varies.

More specifically, the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis.

Even more specifically, if a magnitude of a normalized first digital voltage value corresponding to the first fluxgate sensor is greater than a normalized second digital voltage value corresponding to the second fluxgate sensor, and the magnitude of the normalized second digital voltage value is greater than a normalized third digital voltage value corresponding to the third fluxgate sensor, the azimuth is calculated by use of an equation as below:

$$\text{orientation angle} = 60° \times \frac{\text{second voltage value}}{\text{reference magnitude value}}$$

wherein the second voltage value is a linear voltage value corresponding to the second fluxgate sensor.

Even more specifically, if a magnitude of a normalized second digital voltage value corresponding to the second fluxgate sensor is greater than a normalized first digital voltage value corresponding to the first fluxgate sensor, and the magnitude of the normalized first digital voltage value is greater than a normalized third digital voltage value corresponding to the third fluxgate sensor, the azimuth is calculated by use of an equation as below:

$$\text{orientation angle} = 120° - 60° \times \frac{\text{first voltage value}}{\text{reference voltage value}}$$

wherein the first voltage value is a linear voltage value corresponding to the first fluxgate sensor.

Even more specifically, if a magnitude of a normalized second digital voltage value corresponding to the second fluxgate sensor is greater than a normalized third digital voltage value corresponding to the third fluxgate sensor, and the magnitude of the normalized third digital voltage value is greater than a normalized first digital voltage value corresponding to the first fluxgate sensor, the azimuth is calculated by use of an equation as below:

$$\text{orientation angle} = 120° + 60° \times \frac{\text{third voltage value}}{\text{reference voltage value}}$$

wherein the third voltage value is a linear voltage value corresponding to the third fluxgate sensor.

Even more specifically, if a magnitude of a normalized third digital voltage value corresponding to the third fluxgate sensor is greater than a normalized second digital voltage value corresponding to the second fluxgate sensor, and the magnitude of the normalized second digital voltage value is greater than a normalized first digital voltage value corresponding to the first fluxgate sensor, the azimuth is calculated by use of an equation as below:

$$\text{orientation angle} = 240° - 60° \times \frac{\text{second voltage value}}{\text{reference voltage value}}$$

wherein the second voltage value is a linear voltage value corresponding to the second fluxgate sensor.

Even more specifically, if a magnitude of a normalized third digital voltage value corresponding to the third fluxgate sensor is greater than a normalized first digital voltage value corresponding to the first fluxgate sensor, and the magnitude of the normalized first digital voltage value is greater than a normalized second digital voltage value corresponding to the second fluxgate sensor, the azimuth is calculated by use of an equation as below:

$$\text{orientation angle} = 240° + 60° \times \frac{\text{first voltage value}}{\text{reference voltage value}}$$

wherein the first voltage value is a linear voltage value corresponding to the second fluxgate sensor.

Even more specifically, if a magnitude of a normalized first digital voltage value corresponding to the first fluxgate sensor is greater than a normalized third digital voltage value corresponding to the third fluxgate sensor, and the magnitude of the normalized third digital voltage value is greater than a normalized second digital voltage value corresponding to the second fluxgate sensor, the azimuth is calculated by use of an equation as below:

$$\text{orientation angle} = 360° - 60° \times \frac{\text{third voltage value}}{\text{reference voltage value}}$$

wherein the third voltage value is a linear voltage value corresponding to the third fluxgate sensor.

In another specific enhancement, the device further includes a drive pulse generation circuit for generating and outputting pulse signals that are input to the three-axis fluxgate-type circuit.

Even more specifically, the device further includes an analog/digital (A/D) conversion circuit for converting the three analog values output from the three-axis flux-gate type circuit to digital values.

Another aspect of the disclosed teachings is a three-axis fluxgate-type magnetism detection device, comprising a three-axis fluxgate-type circuit having three fluxgate sensors for outputting three analog voltage values respectively. A controller selects a set of linear voltage values from the three digital voltage values corresponding to the three analog values and calculate an azimuth based on the set of linear voltage values.

In another specific enhancement, the three digital values in the same phase, the linear voltage values are a set of digital values having a medium magnitude.

More specifically, the device further includes a memory operable to store a reference magnitude value, wherein the controller calculates the azimuth based on a ratio of the reference magnitude value to the set of linear voltage values, and wherein the reference magnitude value is set at an initial stage through rotations of the three-axis fluxgate-type magnetism detection device when a geomagnetic field varies.

More specifically, the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis.

Even more specifically, if a magnitude of a normalized first digital voltage value corresponding to the first fluxgate sensor is greater than a second digital voltage value corresponding to the second fluxgate sensor, and the magnitude of the second digital voltage value is greater than a third digital voltage value corresponding to the third fluxgate sensor, the azimuth is calculated by use of an equation as below:

$$\text{orientation angle} = 60° \times \frac{\text{second voltage value}}{\text{first reference magnitude value}},$$

wherein of the reference magnitude values stored in the memory, the first reference magnitude value refers to a reference magnitude value applied in case that the first, second and third digital values are in an interval of 0° to 60° and wherein the second voltage value is a linear voltage value corresponding to the second fluxgate sensor.

Even more specifically, if a magnitude of a second digital voltage value corresponding to the second fluxgate sensor is greater than a first digital voltage value corresponding to the first fluxgate sensor, and the magnitude of the first digital voltage value is greater than a third digital voltage value corresponding to the third fluxgate sensor, the azimuth is calculated by use of an equation as below:

$$\text{orientation angle} = 120° - 60° \times \frac{\text{first voltage value}}{\text{second reference voltage value}},$$

where, of the reference magnitude values stored in the memory, the second reference magnitude value refers to a reference magnitude value applied in case that the first, second and third digital values are in an interval of 60° to 120°, wherein the first voltage value is a linear voltage value corresponding to the first fluxgate sensor.

Even more specifically, if a magnitude of a second digital voltage value corresponding to the second fluxgate sensor is greater than a third digital voltage value corresponding to the third fluxgate sensor, and the magnitude of the third digital voltage value is greater than a first digital voltage value corresponding to the first fluxgate sensor, the azimuth is calculated by use of an equation as below:

$$\text{orientation angle} = 120° + 60° \times \frac{\text{third voltage value}}{\text{third reference voltage value}}$$

where, of the reference magnitude values stored in the memory, the third reference magnitude value refers to a reference magnitude value applied in case that the first, second and third digital values are in an interval of 120° to 180°, wherein the third voltage value is a linear voltage value corresponding to the third fluxgate sensor.

Even more specifically, if a magnitude of a third digital voltage value corresponding to the third fluxgate sensor is greater than a second digital voltage value corresponding to the second fluxgate sensor, and the magnitude of the second digital voltage value is greater than a first digital voltage value corresponding to the first fluxgate sensor, the azimuth is calculated by use of an equation as below:

$$\text{orientation angle} = 240° - 60° \times \frac{\text{second voltage value}}{\text{fourth reference voltage value}},$$

where, of the reference magnitude values stored in the memory, the fourth reference magnitude value refers to a reference magnitude value applied in case that the first, second and third digital values are in an interval of 180° to 240°, wherein the second voltage value is a linear voltage value corresponding to the second fluxgate sensor.

Even more specifically, if a magnitude of a third digital voltage value corresponding to the third fluxgate sensor is greater than a first digital voltage value corresponding to the first fluxgate sensor, and the magnitude of the first digital voltage value is greater than a second digital voltage value corresponding to the second fluxgate sensor, the azimuth is calculated by use of an equation as below:

$$\text{orientation angle} = 240° + 60° \times \frac{\text{first voltage value}}{\text{fifth reference voltage value}},$$

where, of the reference magnitude values stored in the memory, the first reference magnitude value refers to a reference magnitude value applied in case that the first, second and third digital values are in an interval of 240° to 300°, wherein the first voltage value is a linear voltage value corresponding to the second fluxgate sensor.

Even more specifically, if a magnitude of a first digital voltage value corresponding to the first fluxgate sensor is greater than a third digital voltage value corresponding to the third fluxgate sensor, and the magnitude of the third digital voltage value is greater than a second digital voltage value corresponding to the second fluxgate sensor, the azimuth is calculated by use of an equation as below:

$$\text{orientation angle} = 360° - 60° \times \frac{\text{third voltage value}}{\text{Sixth reference voltage value}},$$

where, of the reference magnitude values stored in the memory, the sixth reference magnitude value refers to a reference magnitude value applied in case that the first, second and third digital values are in an interval of 300° to 360°, wherein the third voltage value is a linear voltage value corresponding to the third fluxgate sensor.

Even more specifically, a drive pulse generation circuit for generating and outputting pulse signals that are input to the three-axis fluxgate-type circuit.

Even more specifically, the device further includes an analog/digital (A/D) conversion circuit for converting the three analog values output from the three-axis flux-gate type circuit to digital values.

BRIEF DESCRIPTION OF THE DRAWINGS

The above aspects and features of the present invention will be more apparent by describing certain embodiments of the present invention with reference to the accompanying drawings, in which.

DETAILED DESCRIPTION

Hereinafter, exemplary embodiments embodying aspects of the disclosed teachings will be described in detail with reference to the accompanying drawings.

Figure 3:
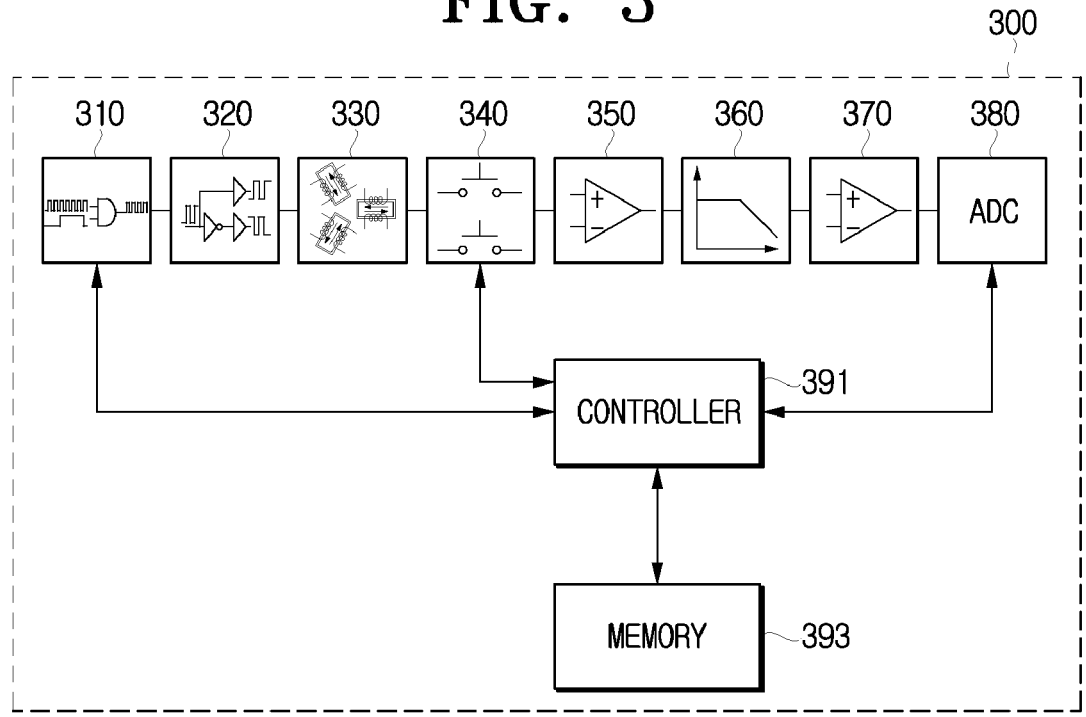
FIG. 3 is a block diagram for showing a magnetism detection device using a three-axis fluxgate-type circuit according to an embodiment of the present invention.
Figure 4:
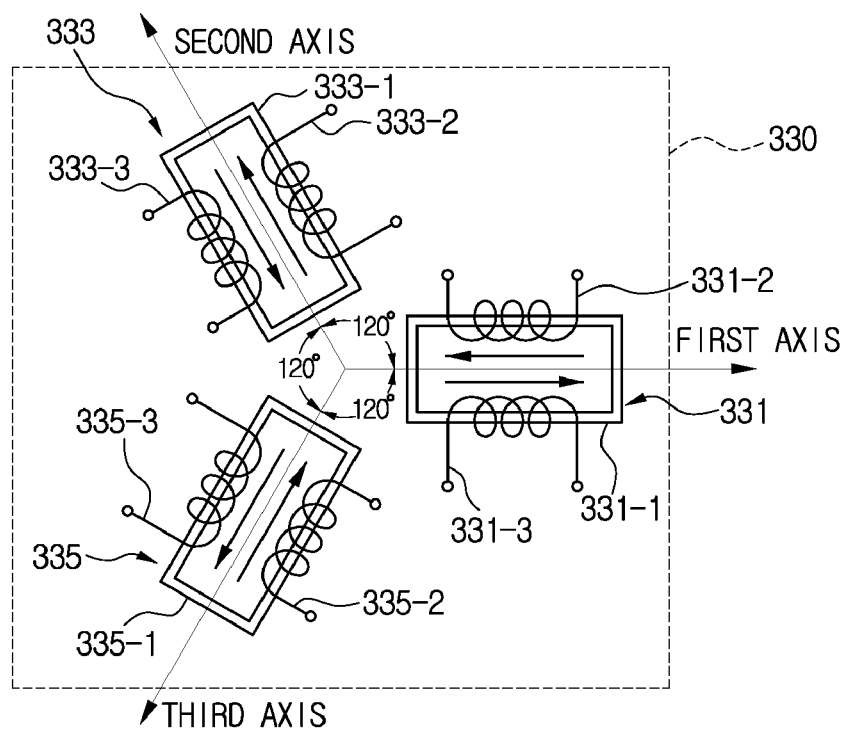
FIG. 4 is a view for showing the three-axis fluxgate-type circuit of the magnetism detection device of FIG. 3.

FIG. 3 is a block diagram for showing a magnetism detection device 300 using a three-axis fluxgate-type circuit embodying aspects of the disclosed teachings. FIG. 4 is a block diagram for showing in detail a three-axis fluxgate-type circuit 330 of the magnetism detection device 300 of FIG. 3.

Figure 1:
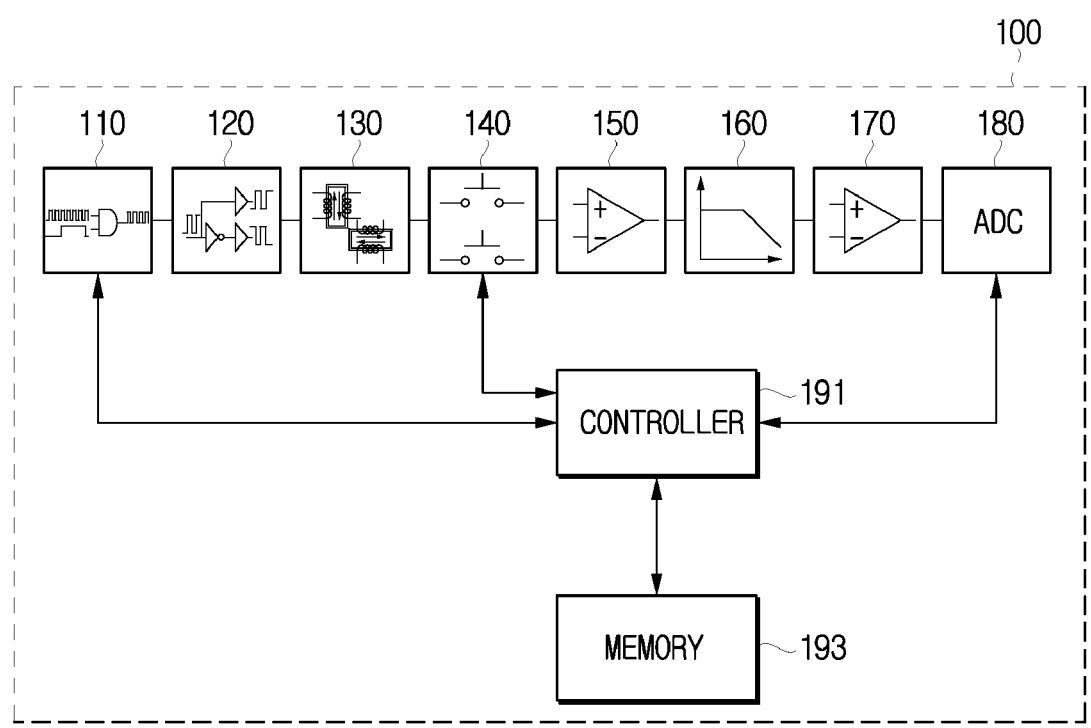
FIG. 1 is a block diagram for showing a conventional magnetism detection device using a fluxgate circuit.
Figure 2:
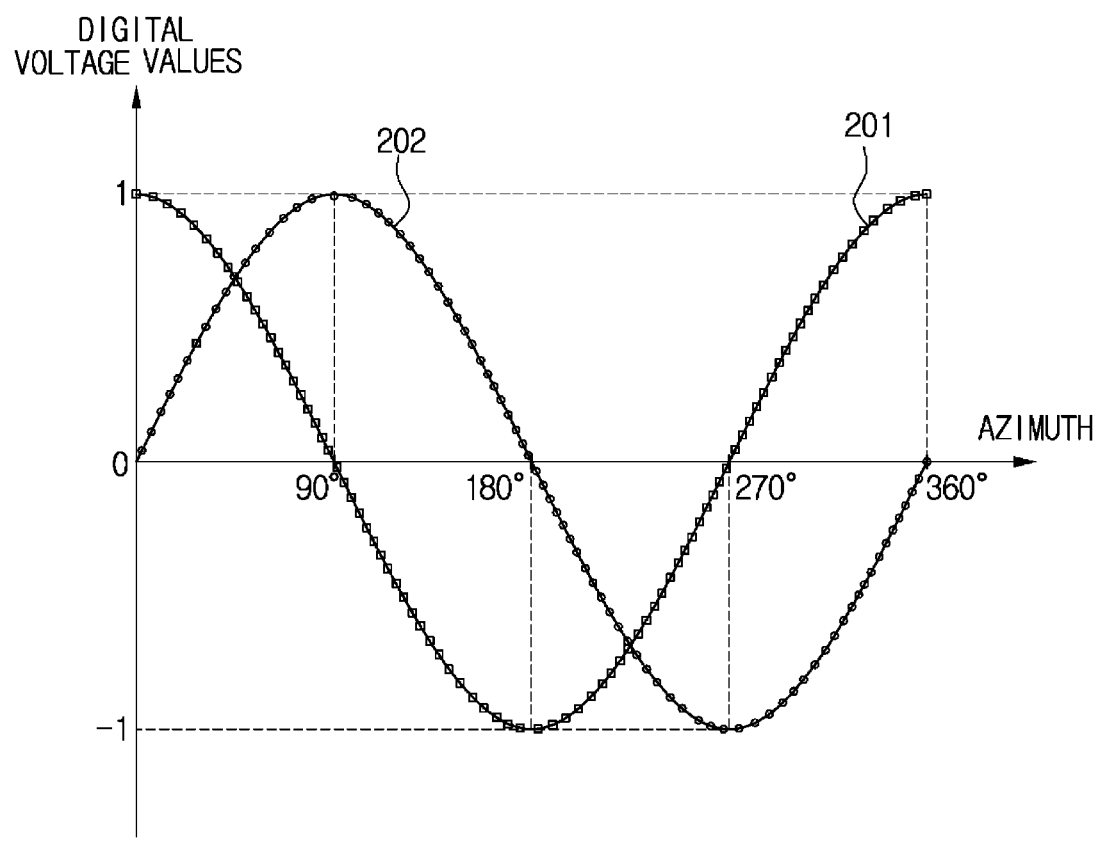
FIG. 2 is a view for showing waveforms of digital voltage values calculated from the magnetism detection device of FIG. 1.

The magnetism detection device 300 embodying aspects of the disclosed teachings comprises a drive pulse generation circuit 310, a coil-driving current amplification circuit 320, a three-axis fluxgate-type circuit 330, a chopping circuit 340, a primary amplification circuit 350, a low-pass filter 360, a secondary amplification circuit 370, an A/D converter 380, a controller 391, and a memory 393. Hereinafter, descriptions of items already described in relation to FIG. 1 will be omitted to avoid repeated explanations.

The three-axis fluxgate-type circuit 330 embodying aspects of the disclosed teachings is driven by pulse signals and inverted pulse signals that are selectively sent to any of a first fluxgate sensor 331 in an X axis (referred to as a first axis, hereinafter), a second fluxgate sensor 333 in an axis (referred to as a second axis, hereinafter) counterclockwise rotated 120° from the first axis, and a third fluxgate sensor 335 in an axis (referred to as a third axis, hereinafter) counterclockwise rotated 240° from the first axis. Analog voltage values are output corresponding to a drive axis selected according to an electromotive force induced by the driven circuit 330. The analog voltage values are converted into digital voltage values using the chopping circuit 340, primary amplification circuit 350, low-pass filter 360, secondary amplification circuit 370, and A/D converter 380. The converted digital voltage values are output to the controller 391.

As shown in FIG. 4, the fluxgate sensors 331, 333, and 335 of the three-axis fluxgate circuit 330 have rectangle-shaped magnetic cores 331-1, 333-1, and 335-1, driving coils 331-2, 333-2, and 335-2 respectively wound around the magnetic cores 331-1, 333-1, and 335-1, and detection coils 331-3, 333-3, and 335-3, respectively.

The controller 391 inputs digital voltage values (referred to as first voltage values, hereinafter) corresponding to the first fluxgate sensor 331, digital voltage values (referred to as second voltage values, hereinafter) corresponding to the second fluxgate sensor 333, and digital voltage values (referred to as third voltage values, hereinafter) corresponding to the third fluxgate sensor 335.

Further, the memory 393 stores a reference magnitude value calculated when the magnetism detection device 300 rotates such that the geomagnetic field varies. The reference magnitude value is a value calculated to provide a reference value prior to using the fluxgate-type magnetism detection device 300, and the reference magnitude value is calculated when the fluxgate-type magnetism detection device 300 rotates.

Figure 5:
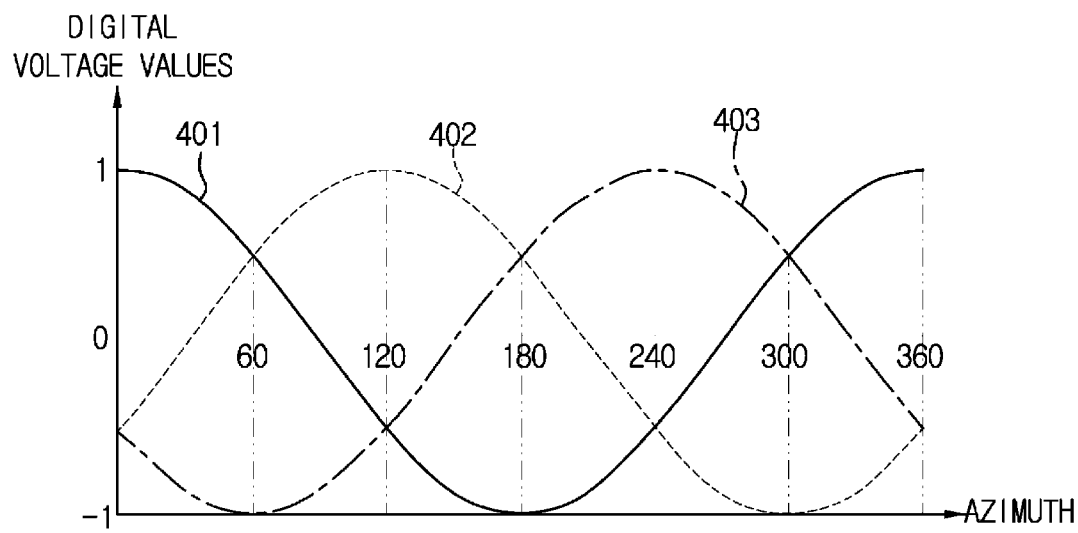
FIG. 5 is a view for showing waveforms of digital voltage values calculated from the magnetism detection device of FIG. 3.

FIG. 5 is a view for showing waveforms of digital voltage values output from the individual fluxgate sensors of FIG. 4, wherein a reference number 401 is a waveform (in solid line) of digital voltage values corresponding to the first fluxgate sensor 331, a reference number 402 is a waveform (in dotted line) of digital voltage values corresponding to the second fluxgate sensor 333, and a reference number 403 is a waveform (in one-dot chain line) of digital voltage values corresponding to the third fluxgate sensor 335. FIG. 5 shows unnormalized digital voltage values.

Since the fluxgate sensors 331-1, 333-1, and 335-1 of the three-axis fluxgate-type circuit 330 are arranged spaced at 120° therebetween, the waveforms in FIG. 5 shows a phase difference of 120° therebetween.

The controller 391 inputs three digital voltage values, and compares the magnitudes of the digital voltage values with one another. The controller 391 selects digital voltage values having a medium magnitude out of the three digital voltage values in each of intervals as a result of the comparison. FIG.

5 shows the intervals spaced at 60° therebetween. Hereinafter, the digital voltage values selected in each of the intervals are referred to as linear voltage values.

Figure 6:
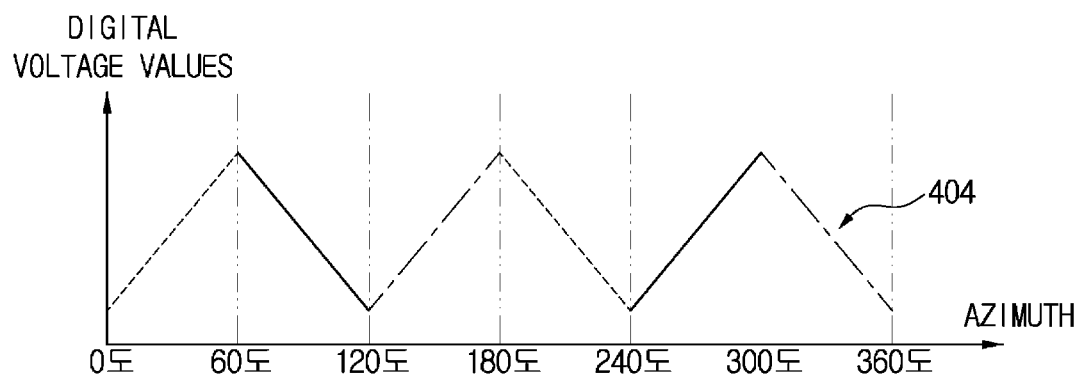
FIG. 6 is a view for showing only linear portions selected from the waveforms of FIG. 5.

FIG. 6 is a view for showing a waveform formed when linearly incrementing or decrementing portions of the waveforms of FIG. 5 are selected, and the shown waveform forms a triangular waveform.

FIG. 5 shows an interval ranging from 0° to 360° only for the sake of convenient descriptions. The interval from 0° to 360° is divided into intervals of 0° to 60°, 60° to 120°, 120° to 180°, 180° to 240°, 240° to 300°, and 300° to 360°, linear voltage values in the interval of 0° to 60° are the second voltage values, linear voltage values in the interval of 60° to 120° are the first voltage values, linear voltage values in the interval of 120° to 180° are the third voltage values, linear voltage values in the interval of 180° to 240° are the second voltage values, linear voltage values in the interval of 240° to 300° are the first voltage values, and linear voltage values in the interval of 300° to 360° are the third voltage values. As described above, the digital voltage values selected from each of the intervals refer to those that correspond to the medium magnitudes obtained as the controller 391 compares the magnitudes of the digital voltage values.

Figure 7:
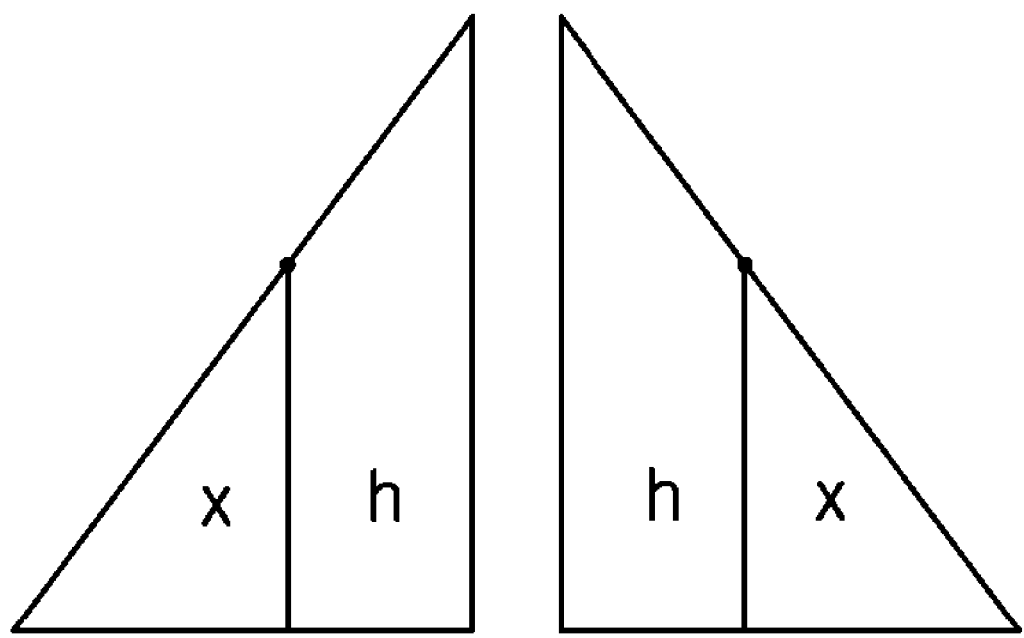
FIG. 7 is a view, as a part of the waveforms of FIG. 6, for explaining a method for calculating azimuths according to an embodiment of the present invention.

FIG. 7 shows a part of the waveform of FIG. 6, which is a view used to describe a process for calculating an azimuth according to the disclosed teachings. A reference numeral h denotes a reference magnitude value calculated through the rotations of the fluxgate-type magnetism detection device 300 at the initial stage and stored in the memory 393. A reference numeral x denotes linear voltage values which are digital voltage values selected from digital voltage values at every phase. However, it should be noted that that the same reference is applied to the magnitudes of h and x.

If the controller 391 selects linear voltage values to be applied to each of the intervals, the controller 391 calculates an azimuth based on the selected linear voltage values and the stored reference magnitude value.

Different equations are applied depending upon intervals for azimuth calculations, the application of which is based on the magnitude of each digital voltage value.

The controller 391 calculates an azimuth based on Equation 2 as below in a phase interval having the first voltage values, second voltage values, and third voltage values in descending order. In FIG. 7, the values in the phase interval of 0° to 60° are arranged in such a magnitude order.

$$\text{orientation angle} = 60° \times \frac{\text{second voltage value}}{\text{reference voltage value}} \quad \text{[Equation 2]}$$

The controller 391 calculates an azimuth based on Equation 3 as below in a phase interval having the second voltage values, first voltage values, and third voltage values in descending order. In FIG. 7, the values in the phase interval of 60° to 120° are arranged in such a magnitude order.

$$\text{orientation angle} = 120° - 60° \times \frac{\text{first voltage value}}{\text{reference voltage value}} \quad \text{[Equation 3]}$$

The controller 391 calculates an azimuth based on Equation 4 as below in a phase interval having the second voltage values, third voltage values, and first voltage values in descending order. In FIG. 7, the values in the phase interval of 120° to 180° are arranged in such a magnitude order.

$$\text{orientation angle} = 120° + 60° \times \frac{\text{third voltage value}}{\text{reference voltage value}} \quad \text{[Equation 4]}$$

The controller 391 calculates an azimuth based on Equation 5 as below in a phase interval having the third voltage values, second voltage values, and first voltage values in descending order. In FIG. 7, the values in the phase interval of 180° to 240° are arranged in such a magnitude order.

$$\text{orientation angle} = 240° - 60° \times \frac{\text{second voltage value}}{\text{reference voltage value}} \quad \text{[Equation 5]}$$

The controller 391 calculates an azimuth based on Equation 6 as below in a phase interval having the third voltage values, first voltage values, and second voltage values in descending order. In FIG. 7, the values in the phase interval of 240° to 300° are arranged in such a magnitude order.

$$\text{orientation angle} = 240° + 60° \times \frac{\text{first voltage value}}{\text{reference voltage value}} \quad \text{[Equation 6]}$$

The controller 391 calculates an azimuth based on Equation 7 as below in a phase interval having the first voltage values, third voltage values, and second voltage values in descending order. In FIG. 7, the values in the phase interval of 300° to 360° are arranged in such a magnitude order.

$$\text{orientation angle} = 360° - 60° \times \frac{\text{third voltage value}}{\text{reference voltage value}} \quad \text{[Equation 7]}$$

The Equations 2 to 7 as above are derived based on a proportional expression of the voltage values and the reference magnitude value. That is, the Equations 2 to 7 are derived based on the proportional expression as in {linear voltage values:reference magnitude value=azimuth: any of 0°, 60°, 120°, 180°, 240°, 300°, and 360° applied depending upon intervals}.

Figure 8:
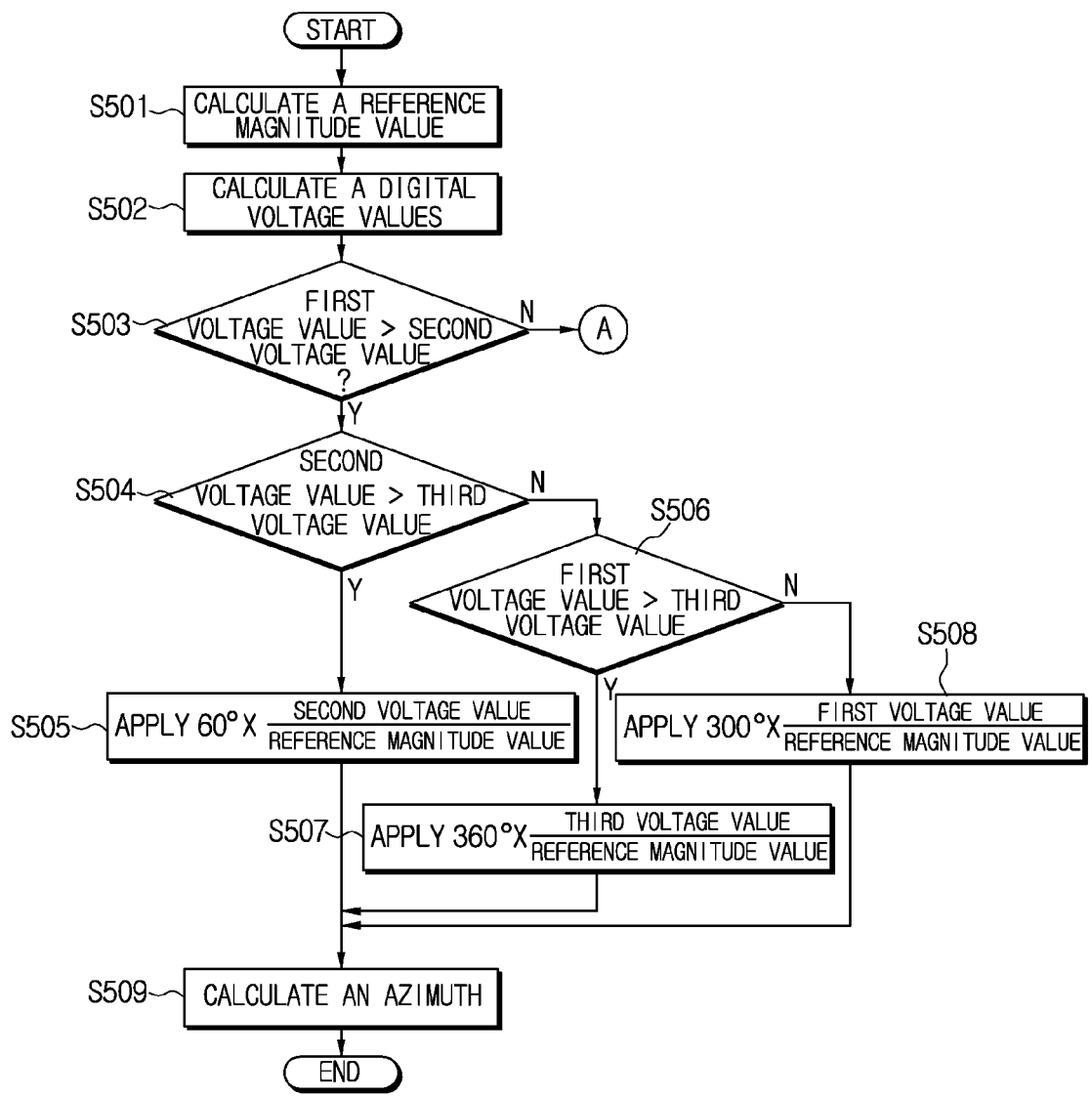
FIG. 8 and FIG. 9 are flow charts for explaining a magnetism detection method using the three-axis fluxgate-type circuit according to an embodiment of the present invention.
Figure 9:
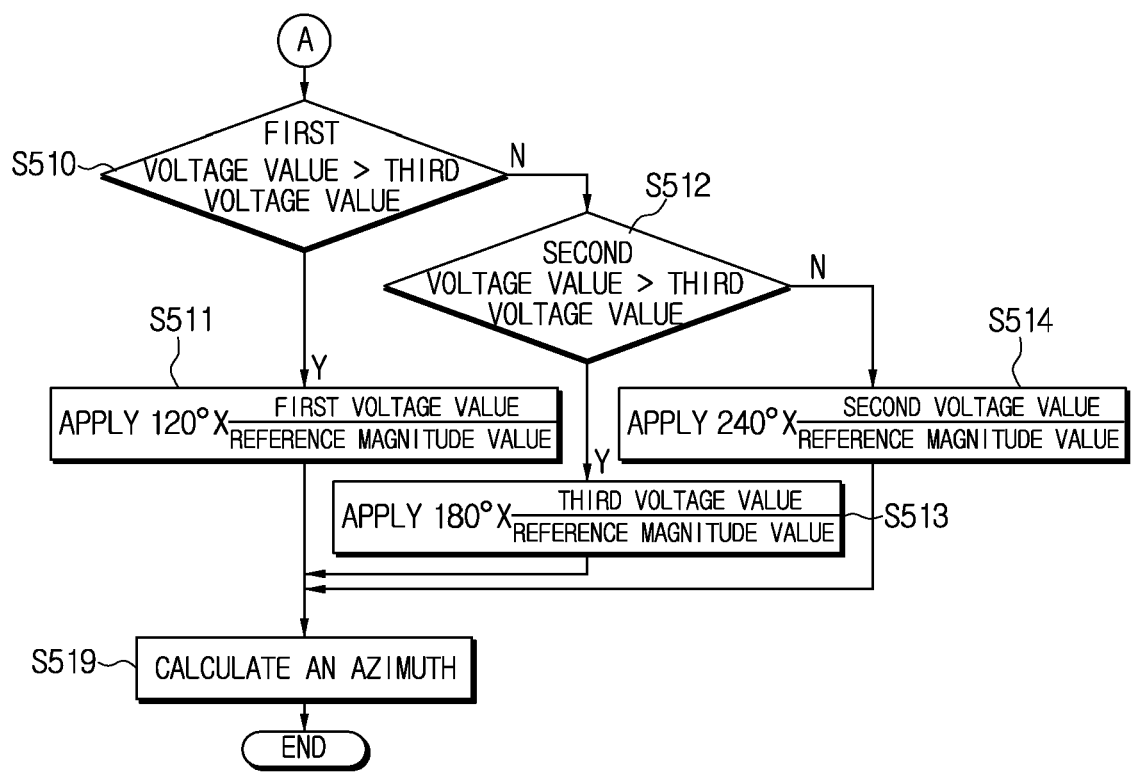

FIG. 8 and FIG. 9 are flow charts showing examples of a magnetism detection process using a three-axis fluxgate-type circuit according to an embodiment of the present invention.

First, a user performs a calibration job so that a reference magnitude value is calculated, and the calculated reference magnitude value is stored in the memory 393 under the controls of the controller 391 (S501). Next, the user moves the fluxgate-type magnetism detection device 300 so that analog voltage values are output from the three-axis fluxgate-type circuit 330, the analog voltage values are converted into digital voltage values through a predetermined process, and the converted digital voltage values are output to the controller 391 (S502).

Next, the controller 391 compares the magnitudes of the output digital voltage values to one another. The present embodiment uses a comparison process as below, but the disclosed teachings are not limited to the process disclosed in here.

First, the controller 391 compares the magnitudes of the first and second voltage values (S503). If the second voltage value is larger than the first voltage value as a result of the comparison in the step S503, the controller 391 performs a routine A. If the first voltage value is larger than the second voltage value, the controller 391 compares the magnitudes of the second and third voltage values (S504). If the second voltage value is larger than the third voltage value, the controller 391 calculates an azimuth using of Equation 1 (S505 and S509).

On the other hand, if the third voltage value is larger than the second voltage value, the controller 391 compares the magnitudes of the first and third voltage values (S506). If the first voltage value is larger than the third voltage value, the controller 391 calculates an azimuth by use of Equation 7 (S507 and S509). If the third voltage value is larger than the first voltage value, the controller 391 calculates an azimuth by use of Equation 6 (S508 and S509).

Further, in the routine A, that is, if the second voltage value is larger than the first voltage value as a result of the comparison in the step S503, the controller 391 compares the magnitudes of the first and third voltage values (S510). If the first voltage value is larger than the third voltage value, the controller 391 calculates an azimuth by use of Equation 3 (S511 and S519). If the third voltage value is larger than the first voltage value, the controller 391 compares the magnitudes of the second and third voltage values (S512). If the second voltage value is larger than the third voltage value, the controller 391 calculates an azimuth by use of Equation 4 (S513 and S519). If the third voltage value is larger than the second voltage value, the controller 391 calculates an azimuth by use of Equation 5 (S514 and S519).

The above embodiment as above calculates azimuths after normalizing digital voltage values, but the azimuths can be calculated without normalizing the digital voltage values. However, there exists a difference between the two processes in that in the above embodiment where normalization is performed, one reference magnitude value is calculated and applied. If no normalization is performed, a different reference magnitude value has to be calculated and applied to each of intervals.

With the above structure and process, the three-axis fluxgate-type magnetism detection device and method have an advantage of performing only a relatively simplified calculation process so that the controller can be protected from an excessive calculation process, reducing errors since only linear parts of digital voltage values are used in the azimuth calculations, and enhancing azimuth repetitiveness performance due to error reductions. Another advantage is that, in the device and method, the memory can be more effectively operated since the values to be stored for calibrations are limited to a reference magnitude value.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A three-axis fluxgate-type magnetism detection device, comprising:

a three-axis fluxgate-type circuit having three fluxgate sensors for outputting three analog voltage values respectively;

a controller operable to normalize three digital voltage values corresponding to said three analog voltage values, select a set of linear voltage values from the three normalized digital voltage values and calculate an azimuth based on the set of linear voltage values; and a memory operable to store a normalized reference magnitude value, wherein the controller calculates the azimuth based on a ratio of the reference magnitude value to the set of linear voltage values, and wherein the reference magnitude value is set at an initial stage through rotations of the three-axis fluxgate-type magnetism detection device when a geomagnetic field varies, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, wherein if a magnitude of a normalized second digital voltage value corresponding to the second fluxgate sensor is greater than a normalized first digital voltage value corresponding to the first fluxgate sensor, and the magnitude of the normalized first digital voltage value is greater than a normalized third digital voltage value corresponding to the third fluxgate sensor, the azimuth is calculated by use of an equation as below:

$$\text{orientation angle} = 120° - 60° \times \frac{\text{first voltage value}}{\text{reference voltage value}}$$

wherein the first voltage value is a linear voltage value corresponding to the first fluxgate sensor.

2. A three-axis fluxgate-type magnetism detection device, comprising:

a three-axis fluxgate-type circuit having three fluxgate sensors for outputting three analog voltage values respectively;

a controller operable to normalize three digital voltage values corresponding to said three analog voltage values, select a set of linear voltage values from the three normalized digital voltage values and calculate an azimuth based on the set of linear voltage values; and a memory operable to store a normalized reference magnitude value, wherein the controller calculates the azimuth based on a ratio of the reference magnitude value to the set of linear voltage values, and wherein the reference magnitude value is set at an initial stage through rotations of the three-axis fluxgate-type magnetism detection device when a geomagnetic field varies, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, wherein if a magnitude of a normalized second digital voltage value corresponding to the second fluxgate sensor is greater than a normalized third digital voltage value corresponding to the third fluxgate sensor, and the magnitude of the normalized third digital voltage value is greater than a normalized first digital voltage value corresponding to the first fluxgate sensor, the azimuth is calculated by use of an equation as below:

$$\text{orientation angle} = 120° + 60° \times \frac{\text{third voltage value}}{\text{reference voltage value}}$$

wherein the third voltage value is a linear voltage value corresponding to the third fluxgate sensor.

3. A three-axis fluxgate-type magnetism detection device, comprising:
- a three-axis fluxgate-type circuit having three fluxgate sensors for outputting three analog voltage values respectively;
- a controller operable to normalize three digital voltage values corresponding to said three analog voltage values, select a set of linear voltage values from the three normalized digital voltage values and calculate an azimuth based on the set of linear voltage values; and
- a memory operable to store a normalized reference magnitude value, wherein the controller calculates the azimuth based on a ratio of the reference magnitude value to the set of linear voltage values, and wherein the reference magnitude value is set at an initial stage through rotations of the three-axis fluxgate-type magnetism detection device when a geomagnetic field varies, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, wherein if a magnitude of a normalized third digital voltage value corresponding to the third fluxgate sensor is greater than a normalized second digital voltage value corresponding to the second fluxgate sensor, and the magnitude of the normalized second digital voltage value is greater than a normalized first digital voltage value corresponding to the first fluxgate sensor, the azimuth is calculated by use of an equation as below:

$$\text{orientation angle} = 240° - 60° \times \frac{\text{second voltage value}}{\text{reference voltage value}}$$

wherein the second voltage value is a linear voltage value corresponding to the second fluxgate sensor.

4. A three-axis fluxgate-type magnetism detection device, comprising:
- a three-axis fluxgate-type circuit having three fluxgate sensors for outputting three analog voltage values respectively;
- a controller operable to normalize three digital voltage values corresponding to said three analog voltage values, select a set of linear voltage values from the three normalized digital voltage values and calculate an azimuth based on the set of linear voltage values; and
- a memory operable to store a normalized reference magnitude value, wherein the controller calculates the azimuth based on a ratio of the reference magnitude value to the set of linear voltage values, and wherein the reference magnitude value is set at an initial stage through rotations of the three-axis fluxgate-type magnetism detection device when a geomagnetic field varies, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, wherein if a magnitude of a normalized third digital voltage value corresponding to the third fluxgate sensor is greater than a normalized first digital voltage value corresponding to the first fluxgate sensor, and the magnitude of the normalized first digital voltage value is greater than a normalized second digital voltage value corresponding to the second fluxgate sensor, the azimuth is calculated by use of an equation as below:

$$\text{orientation angle} = 240° + 60° \times \frac{\text{first voltage value}}{\text{reference voltage value}}$$

wherein the first voltage value is a linear voltage value corresponding to the second fluxgate sensor.

5. A three-axis fluxgate-type magnetism detection device, comprising:
- a three-axis fluxgate-type circuit having three fluxgate sensors for outputting three analog voltage values respectively;
- a controller operable to normalize three digital voltage values corresponding to said three analog voltage values, select a set of linear voltage values from the three normalized digital voltage values and calculate an azimuth based on the set of linear voltage values; and
- a memory operable to store a normalized reference magnitude value, wherein the controller calculates the azimuth based on a ratio of the reference magnitude value to the set of linear voltage values, and wherein the reference magnitude value is set at an initial stage through rotations of the three-axis fluxgate-type magnetism detection device when a geomagnetic field varies, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, wherein if a magnitude of a normalized first digital voltage value corresponding to the first fluxgate sensor is greater than a normalized third digital voltage value corresponding to the third fluxgate sensor, and the magnitude of the normalized third digital voltage value is greater than a normalized second digital voltage value corresponding to the second fluxgate sensor, the azimuth is calculated by use of an equation as below:

$$\text{orientation angle} = 360° - 60° \times \frac{\text{third voltage value}}{\text{reference voltage value}}$$

wherein the third voltage value is a linear voltage value corresponding to the third fluxgate sensor.

6. A three-axis fluxgate-type magnetism detection device, comprising:
- a three-axis fluxgate-type circuit having three fluxgate sensors for outputting three analog voltage values respectively; and a controller operable to select a set of linear voltage values from the three digital voltage values corresponding to the three analog values and calculate an azimuth based on the set of linear voltage values, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, if a magnitude of a second digital voltage value corresponding to the second fluxgate sensor is greater than a first digital voltage value corresponding to the first fluxgate sensor, and the magnitude of the first digital voltage value is greater than a third digital voltage value corresponding to the third fluxgate sensor, the azimuth is calculated by use of an equation as below:

$$\text{orientation angle} = 120° - 60° \times \frac{\text{first voltage value}}{\text{second reference voltage value}}$$

where the second reference magnitude value refers to a reference magnitude value applied in case that the first, second and third digital values are in an interval of 60° to 120° wherein the first voltage value is a linear voltage value corresponding to the first fluxgate sensor.

7. A three-axis fluxgate-type magnetism detection device, comprising:
a three-axis fluxgate-type circuit having three fluxgate sensors for outputting three analog voltage values respectively; and
a controller operable to select a set of linear voltage values from the three digital voltage values corresponding to the three analog values and calculate an azimuth based on the set of linear voltage values,
wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis,
if a magnitude of a second digital voltage value corresponding to the second fluxgate sensor is greater than a third digital voltage value corresponding to the third fluxgate sensor, and the magnitude of the third digital voltage value is greater than a first digital voltage value corresponding to the first fluxgate sensor, the azimuth is calculated by use of an equation as below:

$$\text{orientation angle} = 120° + 60° \times \frac{\text{third voltage value}}{\text{third reference voltage value}}$$

where the third reference magnitude value refers to a reference magnitude value applied in case that the first, second and third digital values are in an interval of 120° to 180° wherein the third voltage value is a linear voltage value corresponding to the third fluxgate sensor.

8. A three-axis fluxgate-type magnetism detection device, comprising:
a three-axis fluxgate-type circuit having three fluxgate sensors for outputting three analog voltage values respectively; and
a controller operable to select a set of linear voltage values from the three digital voltage values corresponding to the three analog values and calculate an azimuth based on the set of linear voltage values, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, if a magnitude of a third digital voltage value corresponding to the third fluxgate sensor is greater than a second digital voltage value corresponding to the second fluxgate sensor, and the magnitude of the second digital voltage value is greater than a first digital voltage value corresponding to the first fluxgate sensor, the azimuth is calculated by use of an equation as below:

$$\text{orientation angle} = 240° - 60° \times \frac{\text{second voltage value}}{\text{fourth reference voltage value}}$$

where the fourth reference magnitude value refers to a reference magnitude value applied in case that the first, second and third digital values are in an interval of 180° to 240° wherein the second voltage value is a linear voltage value corresponding to the second fluxgate sensor.

9. A three-axis fluxgate-type magnetism detection device, comprising:
a three-axis fluxgate-type circuit having three fluxgate sensors for outputting three analog voltage values respectively; and
a controller operable to select a set of linear voltage values from the three digital voltage values corresponding to the three analog values and calculate an azimuth based on the set of linear voltage values,
wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis,
if a magnitude of a third digital voltage value corresponding to the third fluxgate sensor is greater than a first digital voltage value corresponding to the first fluxgate sensor, and the magnitude of the first digital voltage value is greater than a second digital voltage value corresponding to the second fluxgate sensor, the azimuth is calculated by use of an equation as below:

$$\text{orientation angle} = 240° + 60° \times \frac{\text{first voltage value}}{\text{fifth reference voltage value}}$$

where the fifth reference magnitude value refers to a reference magnitude value applied in case that the first, second and third digital values are in an interval of 240° to 300° wherein the first voltage value is a linear voltage value corresponding to the second fluxgate sensor.

10. A three-axis fluxgate-type magnetism detection device, comprising:
a three-axis fluxgate-type circuit having three fluxgate sensors for outputting three analog voltage values respectively; and
a controller operable to select a set of linear voltage values from the three digital voltage values corresponding to the three analog values and calculate an azimuth based on the set of linear voltage values, wherein the three fluxgate sensors are a first fluxgate sensor in an X axis, a second fluxgate sensor in an axis counterclockwise rotated 120° from the X axis, and a third fluxgate sensor in an axis counterclockwise rotated 240° from the X axis, if a magnitude of a first digital voltage value corresponding to the first fluxgate sensor is greater than a third digital voltage value corresponding to the third fluxgate sensor, and the magnitude of the third digital voltage value is greater than a second digital voltage value corresponding to the second fluxgate sensor, the azimuth is calculated by use of an equation as below:

$$\text{orientation angle} = 360° - 60° \times \frac{\text{third voltage value}}{\text{Sixth reference voltage value}}$$

where the sixth reference magnitude value refers to a reference magnitude value applied in case that the first, second and third digital values are in an interval of 300° to 360° wherein the third voltage value is a linear voltage value corresponding to the third fluxgate sensor.

* * * * *